United States Patent
Talwani et al.

[19]

[11] Patent Number: 6,152,226

[45] Date of Patent: Nov. 28, 2000

[54] SYSTEM AND PROCESS FOR SECONDARY HYDROCARBON RECOVERY

[75] Inventors: Manik Talwani, Houston, Tex.; Walter K Feldman, Smithtown; Melvin Schweitzer, Port Washington, both of N.Y.

[73] Assignee: Lockheed Martin Corporation, Bethesda, Md.

[21] Appl. No.: 09/309,508

[22] Filed: May 11, 1999

Related U.S. Application Data

[60] Provisional application No. 60/085,059, May 12, 1998, provisional application No. 60/109,138, Nov. 18, 1998, provisional application No. 60/107,329, Nov. 6, 1998, provisional application No. 60/107,366, Nov. 6, 1998, and provisional application No. 60/099,937, Sep. 11, 1998.

[51] Int. Cl.$^7$ .............................. E21B 47/00; E21B 47/10
[52] U.S. Cl. ................ 166/252.4; 166/245; 166/250.03; 73/152.39
[58] Field of Search .................................. 166/245, 252.1, 166/252.4, 250.03; 73/152.05, 152.39, 382 R

[56] References Cited

U.S. PATENT DOCUMENTS

| | | | |
|---|---|---|---|
| 3,338,095 | 8/1967 | Johnson et al. ...................... 166/252.6 |
| 3,630,086 | 12/1971 | Wilk . | |
| 3,731,537 | 5/1973 | Trageser ..................................... 73/382 |
| 4,060,718 | 11/1977 | Huddle ..................................... 364/421 |
| 4,085,798 | 4/1978 | Schweitzer et al. ................. 166/252.4 |
| 4,100,482 | 7/1978 | Yamashita et al. .......................... 324/6 |
| 4,143,714 | 3/1979 | Agnew ................................. 166/252.4 |
| 4,381,544 | 4/1983 | Stamm ..................................... 364/420 |
| 4,435,981 | 3/1984 | Carson et al. ......................... 73/382 R |
| 5,001,634 | 3/1991 | Nordin ................................... 364/420 |
| 5,218,864 | 6/1993 | Pennybaker ...................... 73/382 R X |
| 5,339,684 | 8/1994 | Jircitano et al. . | |
| 5,341,681 | 8/1994 | Molny et al. ......................... 73/382 G |
| 5,357,802 | 10/1994 | Hofmeyer et al. .................... 73/382 G |
| 5,390,114 | 2/1995 | Chapin ................................... 364/420 |
| 5,402,340 | 3/1995 | White et al. ............................ 364/420 |
| 5,543,714 | 8/1996 | Blanpain et al. ....................... 324/345 |
| 5,586,082 | 12/1996 | Anderson et al. ........................ 367/73 |
| 5,588,032 | 12/1996 | Johnson et al. .............................. 378/8 |
| 5,661,649 | 8/1997 | Carson et al. .......................... 364/420 |
| 5,673,191 | 9/1997 | Chapin et al. .......................... 364/420 |
| 5,734,104 | 3/1998 | Panenka ................................. 73/382 G |
| 5,764,515 | 6/1998 | Guerillot et al. ...................... 364/420 |
| 5,912,643 | 6/1999 | Chew et al. . | |
| 5,922,951 | 7/1999 | O'Keefe et al. ...................... 73/382 G |

FOREIGN PATENT DOCUMENTS

| | | | |
|---|---|---|---|
| 2104354 | 2/1995 | Canada ............................ G01V 7/16 |
| WO 95/05576 | 2/1995 | WIPO ............................. G01C 9/08 |
| WO 95/05615 | 2/1995 | WIPO ............................. G01V 7/16 |
| WO 97/41459 | 11/1997 | WIPO ............................. G01V 7/16 |
| WO 98/15852 | 4/1998 | WIPO ............................. G01V 7/12 |
| WO 98/57196 | 12/1998 | WIPO ............................. G01V 7/02 |
| WO 98/57197 | 12/1998 | WIPO ............................. G01V 7/16 |
| WO 99/32906 | 7/1999 | WIPO . | |

OTHER PUBLICATIONS

Talwani, Manik "Time–Lapse (4D) Gravity Gradiometry", Potential Fields Group Bi–Monthly Meeting, Houston, TX. Nov. 19, 1998.

Rogers, M.J.B et al. "Detailed Anaysis of Honeywell In–space Accelerometer Data—STS–32", Micro–gravity Sci. Technol. VI/1. pp. 28–33. 1993.

Sasaki, Susumu "Microgravity Environment of Space Flyer Unit" Aug. 1998.

(List continued on next page.)

*Primary Examiner*—George Suchfield
*Attorney, Agent, or Firm*—Ronald R. Snider; Snider & Asscoicates

[57] ABSTRACT

A hydrocarbon reservoir undergoing secondary recovery is subject to a first and then at least a second gravity gradient survey in which a gravity gradiometer takes gradient measurements on the surface above the reservoir to define successive data sets. The differences between the first and subsequent gravity gradient survey yields information as to sub-surface density changes consequent to displacement of the hydrocarbon and the replacement thereof by the driveout fluid including the position, morphology, and velocity of the interface between the hydrocarbon to be recovered and the driveout fluid.

22 Claims, 12 Drawing Sheets

OTHER PUBLICATIONS

Bell, Robin E. "Gravity Gradiometry", Scientific American, pp 74–79. Jun. 1998.

Jekeli, Christopher "The Gravity Gradiometer Survey System (GGSS)", Eos, vol. 69, No. 8, pp 105, 116–117. Feb. 23, 1988.

Metzger, Ernest H. "Recent Gravity Gradiometer Developments", Bell Aerospace Textron, Buffalo, NY, pp 306–315. Date Unknown.

Rhodes, Jay "A new approach—The search for BHP's future", BHP Review, pp 26–29 Dec. 1998.

Shaw, Captain H., et al. "The theory and Practical Employment of the EOTVOS Torsion Balance", Mining Magazine, pp 11–21, pp 201–212, pp 274–282, pp 339–347, Jul. 1927.

Hare, Jennifer L., et al. 4–D microgravity modeling and inversion for waterflood surveillance: A model study for the Prudhoe Bay reservoir, Alaska American, pp. 74–79. Date Unknown.

Johnson, Elizabeth A.E., "Gravity and magnetic analyses can address petroleum issues", The Leading Edge, pp. 98–116.-

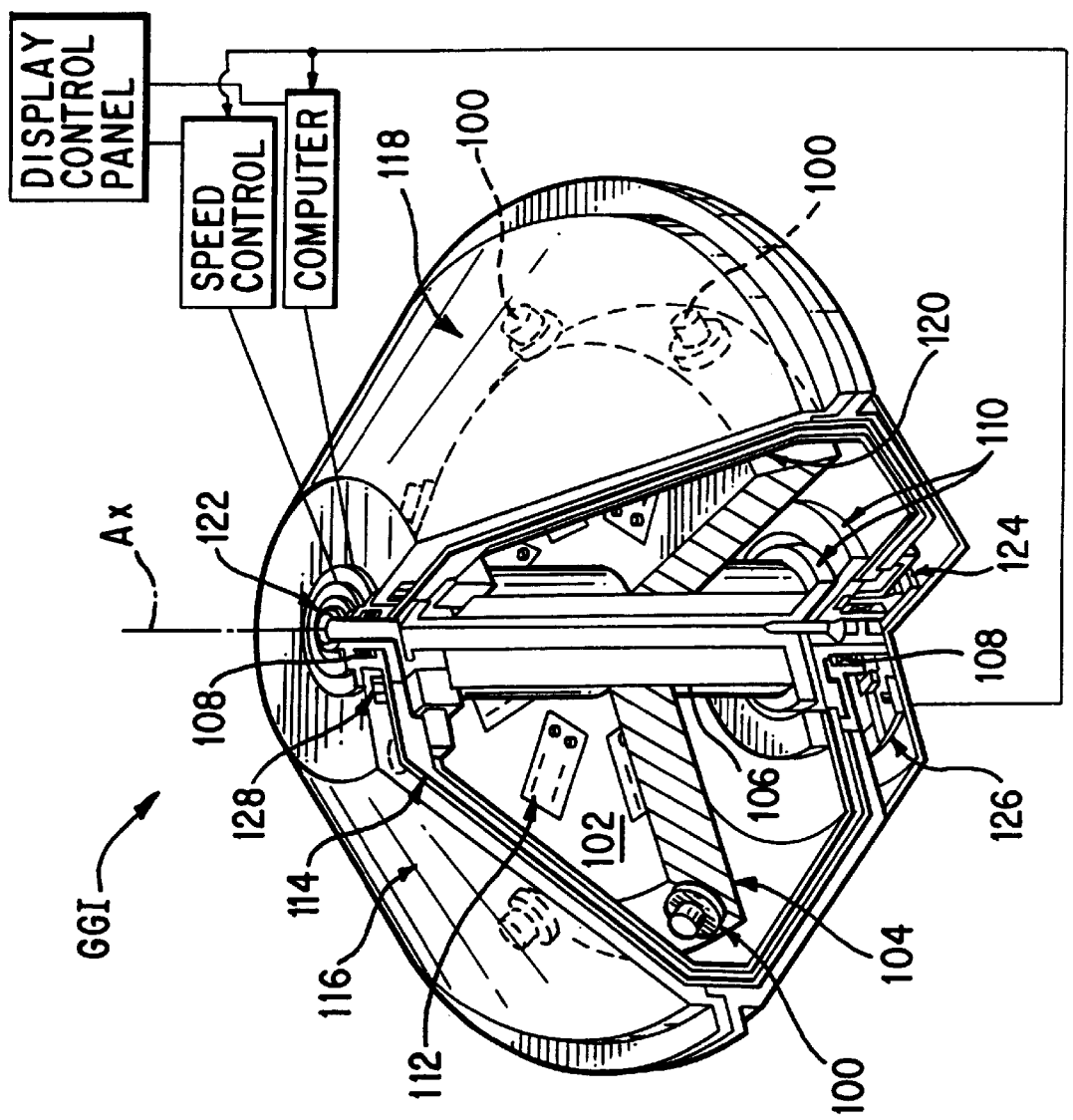

$$I/L = 1/2\,(\Gamma_{yy} - \Gamma_{xx}) \qquad \text{Eq. 1}$$

$$CR = -\,\Gamma_{xy} \qquad \text{Eq. 2}$$

$$\Gamma_{yy} - \Gamma_{xx} = (\Gamma_{ee} - \Gamma_{nn})\cos 2H - 2\Gamma_{ne}\sin 2H$$
$$+ \text{ bias and self-gradient errors} \qquad \text{Eq. 3}$$

$$+\,2\Gamma_{xy} = (\Gamma_{ee} - \Gamma_{nn})\sin 2H + 2\Gamma_{ne}\cos 2H$$
$$+ \text{ bias and self-gradient errors} \qquad \text{Eq. 4}$$

$$\Gamma_{ee} - \Gamma_{nn} = \frac{2\,I/L(H=0^\circ) - 2\,I/L(H=90^\circ)}{2} \qquad \text{Eq. 5}$$

$$\Gamma_{ee} - \Gamma_{nn} = [\,I/L(H=0^\circ) - I/L(H=90^\circ)\,] \qquad \text{Eq. 7}$$

$$-2\Gamma_{ne} = \frac{2\,CR(H=0^\circ) - 2\,CR(H=90^\circ)}{2} \qquad \text{Eq. 8}$$

$$-2\Gamma_{ne} = [\,CR(H=0^\circ) - CR(H=90^\circ)\,] \qquad \text{Eq. 9}$$

FIG. 8

$$DCM = \begin{bmatrix} \cos H \cos P & \sin H \cos P & -\sin P \\ -\sin H & \cos H & 0 \\ \cos H \sin P & \sin H \sin P & \cos P \end{bmatrix} \quad \text{Eq. 1}$$

$$2\, I/L = \Gamma_{yy} - \Gamma_{xx} = [(\Gamma_{ee} - \Gamma_{nn})\cos 2H - (2\Gamma_{ne})\sin 2H]\left[\frac{1+\cos^2 P}{2}\right]$$
$$- \tfrac{3}{2}(\sin^2 P)(\Gamma_{dd})$$
$$+ [\Gamma_{nd}\cos H][\sin 2P] + [\Gamma_{ed}\sin H][\sin 2P]$$
$$+ 2\,\text{error}\,(I/L) \quad \text{Eq. 2}$$

$$-2CR = 2\Gamma_{xy} = [(\Gamma_{ee} - \Gamma_{nn})\sin 2H + 2\Gamma_{ne}\cos 2H][\cos P]$$
$$+ (\Gamma_{nd}\sin H)\,2\sin P - (\Gamma_{ed}\cos H)\,2\sin P \quad \text{Eq. 3}$$
$$+ 2\,\text{error}\,(CR)$$

$$\overline{I/L} = I/L^U + I/L^D \quad \text{Eq. 4}$$

$$\overline{CR} = CR^U + CR^D \quad \text{Eq. 5}$$

$$\overline{I/L} = [(\Gamma_{ee} - \Gamma_{nn})\cos 2H - (2\Gamma_{ne})\sin 2H]\left[\frac{1+\cos^2 P}{2}\right]$$
$$- \tfrac{3}{2}(\sin^2 P)(\Gamma_{dd})$$
$$+ \text{error}\,(\overline{I/L}) \quad \text{Eq. 6}$$

$$-\overline{CR} = [(\Gamma_{ee} - \Gamma_{nn})\sin 2H + 2\Gamma_{ne}\cos 2H]\cos P$$
$$+ \text{error}\,(\overline{CR}) \quad \text{Eq. 7}$$

$$\Gamma_{ee} - \Gamma_{nn} = \left[\frac{\overline{I/L}(H=0°) - \overline{I/L}(H=90°)}{2}\right]\frac{2}{[1+\cos^2 P]} \quad \text{Eq. 8}$$

$$-2\Gamma_{ne} = \left[\frac{2\overline{CR}(H=0°) - 2\overline{CR}(H=90°)}{2}\right]\frac{1}{\cos P} \quad \text{Eq. 9}$$

$$-\underline{I/L} = I/L^U - I/L^D \quad \text{Eq. 10}$$

$$-\underline{CR} = CR^U - CR^D \quad \text{Eq. 11}$$

$$\Gamma_{nd} = \frac{\underline{I/L}(H=180°) - \underline{I/L}(H=0°)}{2\sin|2P|} \quad \text{Eq. 12}$$

$$-\Gamma_{ed} = \frac{\underline{CR}(H=0°) - \underline{CR}(H=180°)}{4\sin|P|} \quad \text{Eq. 13}$$

FIG. 9

SYSTEM AND PROCESS FOR SECONDARY HYDROCARBON RECOVERY

CROSS REFERENCE TO PROVISIONAL PATENT APPLICATIONS

This application claims the benefit of the filing dates of U.S. Provisional Patent Applications No. 60/085,059 filed May 12, 1998, No. 60/109,138 filed Nov. 18, 1998, No. 60/107,329 filed Nov. 6, 1998, No. 60/107,366 filed Nov. 6, 1998, and No. 60/099,937 filed Sep. 11, 1998; the respective disclosures of which are incorporated herein by reference.

BACKGROUND OF THE INVENTION

The present invention relates to a system and process for secondary oil recovery and, more particularly, to a system and process for secondary oil recovery in which the sub-surface boundary or interface between the to-be-recovered oil and the reservoir drive fluid is detected and controlled to optimize recovery, and, still more particularly, to a system and process in which anomalies within the gravitation field caused by density changes and contrasts consequent to the movement over time of the sub-surface boundary between the to-be-recovered oil and the reservoir drive-out or re-pressurizing fluid is monitored.

Oil and natural gas hydrocarbon reservoirs form as a consequence of the transformation of organic matter into various types of hydrocarbon materials, including coals, tars, oils, and natural gas. It is believed that oil and gas reservoirs form as lighter hydrocarbon molecules percolate toward the surface of the earth until they are trapped in a relatively permeable layer beneath a relatively impermeable layer that 'caps' the permeable layer. The lighter hydrocarbon molecules continue accumulating, often accompanied by water molecules, into relatively large sub-surface reservoirs. Since the reservoirs exist at various depths within the earth, they are often under substantial geostatic pressure.

Hydrocarbon resources have been extracted from surface and sub-surface deposits by the mining of solid resources (coal and tars) and by pumping or otherwise removing natural gas and liquid oil from naturally occurring sub-surface deposits.

In the last century, natural gas and oil have been extracted by drilling a borehole into the sub-surface reservoirs. In general, most reservoirs were naturally pressurized by the presence of free natural gas that accumulated above the liquid oil layer and, often, by water that accumulated below the liquid oil layer. Since naturally occurring crude oil has a density lower than that of water (i.e., ranging from 0.7 in the case of 'light' crude oil to 0.9 in the case of 'heavy' crude oil), crude oil accumulates above the water-permeated layer and below the gas-permeated layer. Thus, a borehole terminating within the oil-permeated layer would yield oil that receives its driveout energy from an overlying gas-permeated layer and/or an underlying water-permeated layer.

In general, the 'primary' recovery of crude oil occurs during that period of time that the natural pressurization of a reservoir causes the crude oil to be driven upwardly through the well bore. At some point in the operating life of the reservoir, the naturally occurring pressurization is effectively depleted. Several different methods, known generally as secondary recovery methods, have been developed to extract crude oil after natural pressurization is exhausted. In general, secondary recovery involves re-pressurizing the reservoir with a fluid (i.e., a liquid or a gas) to lower the oil viscosity and/or drive the remaining crude oil in the oil-permeated layer to the surface through one or more wells. The drive fluid is introduced into the reservoir by injection wells which pump the pressurized drive fluid into the reservoir to displace and thereby drive the oil toward and to the producing wells.

Various schemes have been developed for the placement of the injections wells. For example, a line of injection wells can be placed at or adjacent to a known boundary of the reservoir to drive crude oil toward and to the producing wells. As the boundary between the pressurizing fluid advances past the producing wells, those producing wells can be capped or, if desired, converted to injection wells. In another arrangement, injection wells are interspersed between production wells to drive the oil in the oil-permeated layer away from the injection point toward and to immediately adjacent producing wells.

Various fluids, including water at various temperatures, steam, carbon dioxide, and nitrogen, have been used to effect the re-pressurization of the reservoir and the displacement of the desired crude oil from its rock or sand matrix toward the production wells.

In the waterflood technique, water at ambient temperature is injected into a reservoir to drive the oil toward and to the producing wells. The injected water accumulates beneath the crude oil and, in effect, floats the lighter density crude oil upwardly toward and to the borehole of the producing well. In those cases where the oil-permeated layer is relatively thin from a geological perspective and is also confined between two relatively less permeable layers (i.e., an impermeable reservoir ceiling and a more permeable reservoir basement), water is injected at a relatively high pressure and volume to effect an 'edge drive' by which the crude oil is pushed toward the oil producing wells. Sometimes, the injected water is heated to assist in lowering the viscosity of the oil and thereby assist in displacing the crude oil from the pores of the permeable sand or rock. The waterflood technique is also well-suited for driving natural gas entrapped within the pores of relatively low-permeability rock to a producing well.

In the steamflood technique, steam is used to displace or drive oil from the oil bearing sand or rock toward and to the producing wells. The steam, which may initially be superheated, is injected into the oil-permeated layer to cause a re-pressurization of the reservoir. As the steam moves away from its initial injection point, its temperature drops and the quality of the steam decreases with the steam eventually condensing into a hot water layer. Additionally, some of the lighter hydrocarbons may be distilled out of the crude oil as it undergoes displacement at the interface between the steam/hot water and the crude oil. The steam injection can be continuous or on an intermittent start-and-stop basis.

In addition to the use of water and steam to effect reservoir re-pressurization and the driveout of the crude oil toward the production wells, carbon dioxide and nitrogen have also been used for the same purpose.

One problem associated with water, steam, or gas driveout techniques is the identification of the boundary or interface between the driveout fluid and the crude oil. In an optimum situation, the boundary between the driveout fluid and the to-be-displaced crude oil would move in a predictable manner through the reservoir from the injection points to the production wells to maximize the production of crude oil. The geology of a reservoir is generally complex and non-homogeneous and often contains regions or zones of relatively higher permeability sand or rock; these higher permeability zones can function as low-impedance pathways for the pressurized driveout fluid. The pressurized driveout fluid sometimes forms low-impedance channels, known as 'theft' zones, through which the pressurized fluid "punches through" to a producing well to thereby greatly decrease the recovery efficiency.

The ability to identify the position of and the often indistinct interface or boundary between the to-be-displaced crude oil and the pressurized driveout fluid, to track the velocity and morphology of that boundary, and to effect control thereof would substantially enhance secondary oil recovery.

Various techniques have been developed for gaining an understanding of the configuration of the sub-surface geology of an oil-containing reservoir. The dominant technique involves seismic echoing in which a pressure wave is directed downwardly into the sub-surface strata. The initial interrogation wave energy is typically created by the detonation of explosives or by specialized earth-impacting machines. The interrogation wave radiates from its source point with its transmission velocity affected by the elastic modulus and density of the material through which it passes. As with all wave energy, the interrogation wave is subject to reflection, refraction, scattering, absorption, and dampening effects caused by the material through which it passes and from which it is reflected. The reflected wave energy is detected by geophones spaced from the seismic source point and subjected to processing to yield a model of the reservoir. This technique is highly developed and well-suited for detecting sub-surface structures that may be favorable to the accumulation of oil or gas.

Other techniques for investigating sub-surface geology include the use of gravimeters to detect minute changes in the magnitude of the gravity vector for the purpose of detecting sub-surface structures that may be favorable to the accumulation of oil or gas.

The various devices and techniques used to interrogate sub-surface strata have led to significant advances in the ability to create a 3-dimensional model or simulation of the reservoir. However, existing sensing technologies are unable to detect the location and morphology of the boundary or interface between the pressurized driveout fluid and the oil or natural gas in those reservoirs undergoing secondary recovery. Information as to the position, morphology, and velocity of the boundary would be of substantial value in optimizing recovery of the hydrocarbons undergoing recovery, especially in efficient utilization of the driveout fluids.

SUMMARY OF THE INVENTION

In view of the above, it is an object of the present invention, among others, to provide a system and process for improving the recovery of fluid hydrocarbons, such as oil and natural gas, from an oil and/or gas reservoir in which the reservoir is undergoing re-pressurization.

It is another object of the present invention to provide a system and process for secondary hydrocarbon recovery in which a pressurized fluid is used to drive oil and/or natural gas from the reservoir to a producing well.

It is still another object of the present invention to provide a system and process for secondary oil recovery in which the boundary or interface between the to-be-recovered oil and a pressurized fluid driving the to-be-recovered oil can be identified.

It is a further object of the present invention to provide a system and process for secondary hydrocarbon recovery in which the boundary or interface between the to-be-recovered hydrocarbon and a pressurized fluid driving the hydrocarbon can be identified and subsequently controlled to maximize recovery.

In view of these objectives, and others, the present invention provides a system and process for secondary oil or gas recovery in which a reservoir is pressurized with a driveout liquid or gas and the boundary or interface between the driveout fluid and the to-be-displaced hyrocarbon material is monitored over time by sensing the changes in density across the boundary with a gravity gradiometer. Sensed changes in the position, extent, velocity, and morphology of the boundary, including the formation of incipient theft zones, allow for control of the injected driveout fluid to optimize recovery efficiency.

A hydrocarbon reservoir undergoing secondary recovery is subject to an initial gravity gradient survey during which a gravity gradiometer takes gradient measurements on the surface above the reservoir to define an initial data set. At some time in the future, a second gravity gradient survey is conducted to provide a second data set. Differences between the first and second data set yield information as to sub-surface density changes associated with displacement of the gas or oil and the replacement thereof by the driveout fluid. Subsequent gravity gradient surveys similarly displaced in time during the injection of the driveout fluid yield additional information as to the position, morphology, and velocity of the interface allowing an oil field manager to control the number of injection sites and the temperature, pressure, and volume of injected fluid to thus optimize recovery efficiency. The manager can also determine the desirability of drilling new wells, their locations, their segmenting, and desirable orientations of each segment.

In the preferred implementation of the invention, a plurality of gravity gradient measurement stations are established on the surface above an oil or gas reservoir undergoing secondary recovery. A gravity gradient measuring instrument, for example, of the rotating accelerometer type, is positioned at each station in seriatim and data indicative of the gravity gradient at each station is taken to provide a first data set. This first data set yields data constituting baseline information as to the gravity gradient over the reservoir as affected by surface and sub-surface density variations, including the gravity-affecting density contrast at the interface between the driveout fluid and the oil or gas undergoing displacement during the time that the measurements are being taken. At some time subsequent to the measurements that yielded the first data set, i.e., a period of time measured in months or years, the measurements are repeated to yield a second data set. Common data between the first and second data sets are indicative of fixed, substantially invariant data representative of the effect on the gravity gradient of the surface and sub-surface geology while non-common data between the first and second data sets is indicative of a time-dependent change in the gravity gradient consequent to movement over time of the interface between the driveout fluid and the displaced oil or gas and possible geologic noise effects.

After mitigating geologic noise effects, information as to the movement of the interface or boundary is used by an oil field manager to control the number of injection points including volume, pressures, and temperatures to control and improve hydrocarbon recovery.

A particular advantage of the present invention is that the necessity of dealing with invariant common data is substantially eliminated. Only the differences between subsequent sets of data, i.e., the time-lapse gradient data, need to be interpreted in terms of the position of the interface between the driveout fluid and the hydrocarbons undergoing displacement, or, more generally, in terms of the change in the saturation of the various materials in the pore spaces of the reservoir rocks.

An additional advantage of the present invention is that the inherent ambiguity of obtaining sub-surface density information from gradient data is reduced because of the knowledge that the density changes are taking place in only those parts of the sub-surface in which driveout fluids are being injected.

The present invention advantageously provides a system and process for secondary oil recovery that allows observation via measurement of gravity gradients associated with the boundary between the driveout fluid and the to-be-recovered hydrocarbon material in such a manner that recovery efficiency can be optimized.

Other objectives and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1A is an idealized graphical representation of the interface between the driveout fluid and the to-be-displaced oil;

FIG. 1B is an idealized representation of the density contrast at the interface of FIG. 1A;

FIG. 6 is an isometric view of a preferred gravity gradiometer with selected portions thereof broken away for reasons of clarity;

FIG. 8 presents the mathematical derivation for a device-specific protocol for the cancellation of instrument biases and self-gradients;

FIG. 9 presents the mathematical derivation for a device-specific protocol to both eliminate horizontal gradients from the curvature gradient estimates and to estimate the horizontal gradients, both combined with canceling instrument bias and self-gradients;

DESCRIPTION OF THE PREFERRED EMBODIMENT

Figure 1:
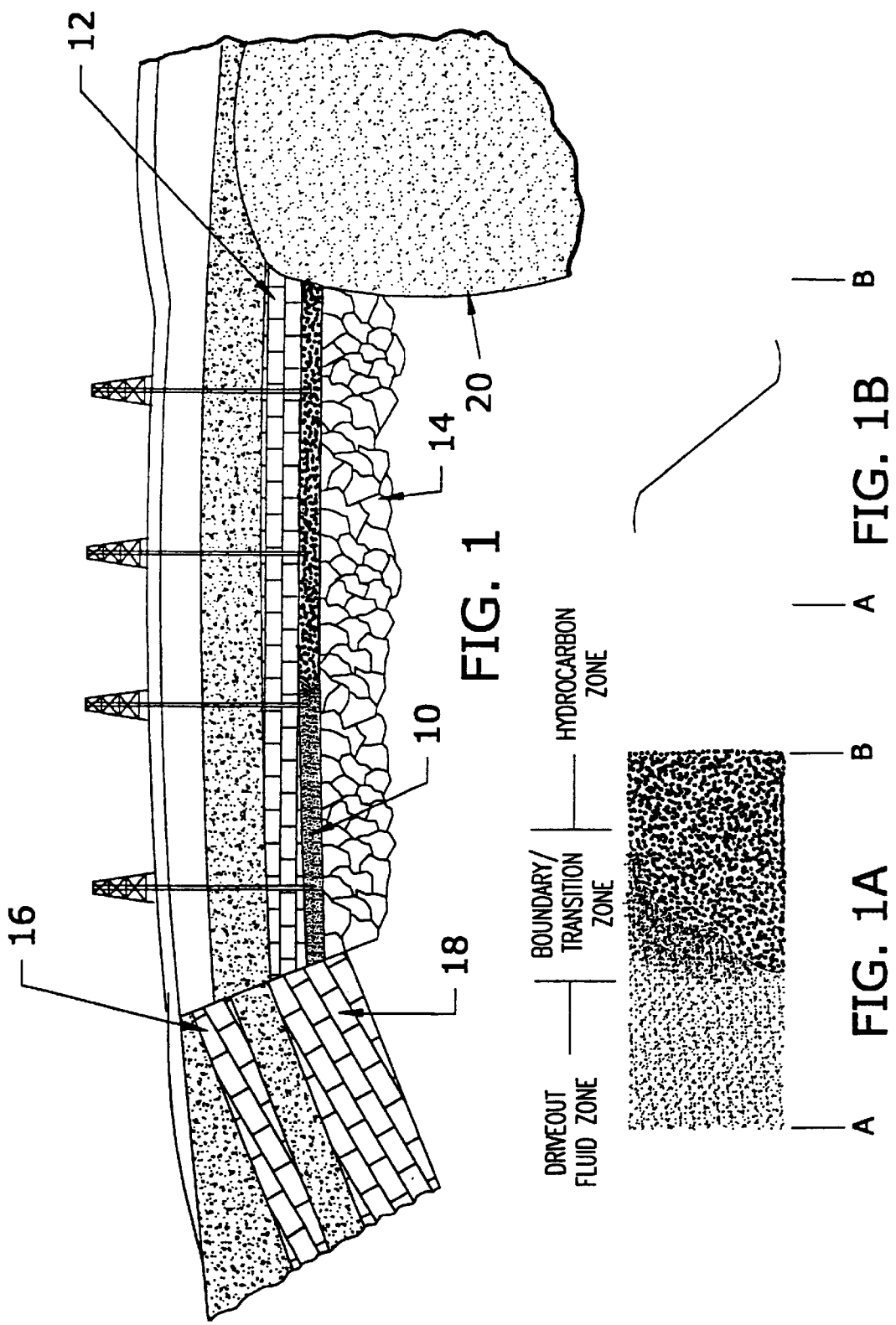
FIG. 1 is a representative cross-sectional view of a oil-producing trap or reservoir undergoing secondary recovery showing the interface between the driveout fluid and the to-be-displaced oil in an idealized fashion.

An idealized and exemplary geologic formation having an oil containing strata is shown in FIG. 1. As shown, an oil-permeated layer 10 is bounded on the top by a relatively impermeable ceiling layer 12 (known as a "seal") and on the bottom by a relatively permeable layer 14. The oil-permeated layer 10 is typically a fine-grain or coarse-grain sand that is permeated by crude oil that typically accumulates between the particles. In a typical formation, the layers can form a shallow dome or anticline under which the oil accumulates; the oil is often accompanied by natural gas and water. In those reservoirs that include natural gas, oil, and water, the natural gas tends to form a layer or region above the oil while the water tends to form a layer or region below the oil. Depending upon the geostatic pressure in the oil-permeated layer, a portion of the gas may go into solution with oil. In general, the interfacial boundaries are typically indistinct, although, in some cases, the boundaries can be geologically distinct.

As shown on the left in FIG. 1, the layers are shifted in a vertical direction along a fault line 16 so that a shifted rock layer 14 creates a plug 18 that defines a lateral boundary of the oil-permeated layer 10. In a similar manner, the sidewall of a salt dome 20, often found in association with oil layers, defines another lateral boundary of the oil-permeated layer 10. In general, the laterally bounded oil-permeated layer 10 confined beneath the ceiling rock is defined as a reservoir and may occur at depths of several tens to several thousand feet below the surface of the earth. The representation of FIG. 1 illustrates a reservoir at a depth of several hundred feet and is merely exemplary of the large variety of geological configurations in which oil reservoirs have been found.

In FIG. 1, four derricks are presented, each with a borehole that penetrates through the several strata into the oil-permeated layer 10. When a naturally pressurized oil reservoir is initially penetrated by a borehole, the oil is driven through the borehole to the surface. In time, however, the pressure in the reservoir decreases to the point where mass transport to the surface ceases or drops to an unacceptable flow rate. At this point, oil flow can be induced using pumps at the surface to extract oil or through repressurization of the reservoir by injecting water, steam, or a gas (i.e., carbon dioxide or nitrogen) into the reservoir through injection wells. In the example of FIG. 1, the two wells on the left are injection wells injecting a repressurizing fluid into the oil bearing layer 10 while the two wells to the right are production wells through which crude oil is removed. The fully black portion of the oil-permeated layer on the right represents available crude oil while the stippled portion of the layer on the left represents that portion of the layer 10 in which the oil has been displaced and replaced by the injected driveout fluid.

In FIG. 1, the transition from the stippled area to the black area represents the interfacial boundary or "front" between the pressurized driveout fluid advancing from the left and the crude oil being displaced thereby to the right toward the production wells. FIG. 1A is an idealized representation of the transition between the driveout fluid and the to-be-displaced oil and illustrates a physical phenomenon that is not fully understood and which may include variables or features not shown. Assuming that the oil-permeated layer is fully saturated with oil and in the case where the driveout fluid is steam, the steam, which may initially be superheated, undergoes a reduction in temperature as it moves away from the injection point and yields its latent heat. At some point, the quality of the steam decreases (i.e., the water content increases) while the heat of vaporization is transferred to the surrounding oil. At this point, steam and/or heated condensed water may undergo forced mixing with the oil and steam-induced fractional distillation may occur, during which some of the light hydrocarbons in the to-be-displaced oil are vaporized to mix with the steam. At some point in the process, steam quality drops to zero or near zero (i.e., the steam condenses to hot water). In FIG. 1A, the gradually denser stippling from the left to the right represents the displacement of the oil from its pores. In general, that about 90% of the oil is displaced from any arbitrarily defined volume unit with 10% of the oil remaining as residual oil; the remaining volume is typically replaced with 30% steam and 60% by water. In FIG. 1A, the steam is shown as overcutting the oil, since steam tends to rise within the oil-permeated layer. The boundary is often indistinct and its morphology may change as a result of water mixed in the lower portions of the oil-permeated layer and natural gas in the upper portion of the oil-permeated layer.

While the example of FIG. 1 shows the secondary recovery of crude oil, the same configuration exists for the secondary recovery of natural gas retained within the pores of the gas permeated layer. In the case where the reservoir of FIG. 1 is a gas trap, the injected fluid (typically, water) would effect displacement of the entrapped natural gas toward and to the producing wells.

Figure 2:
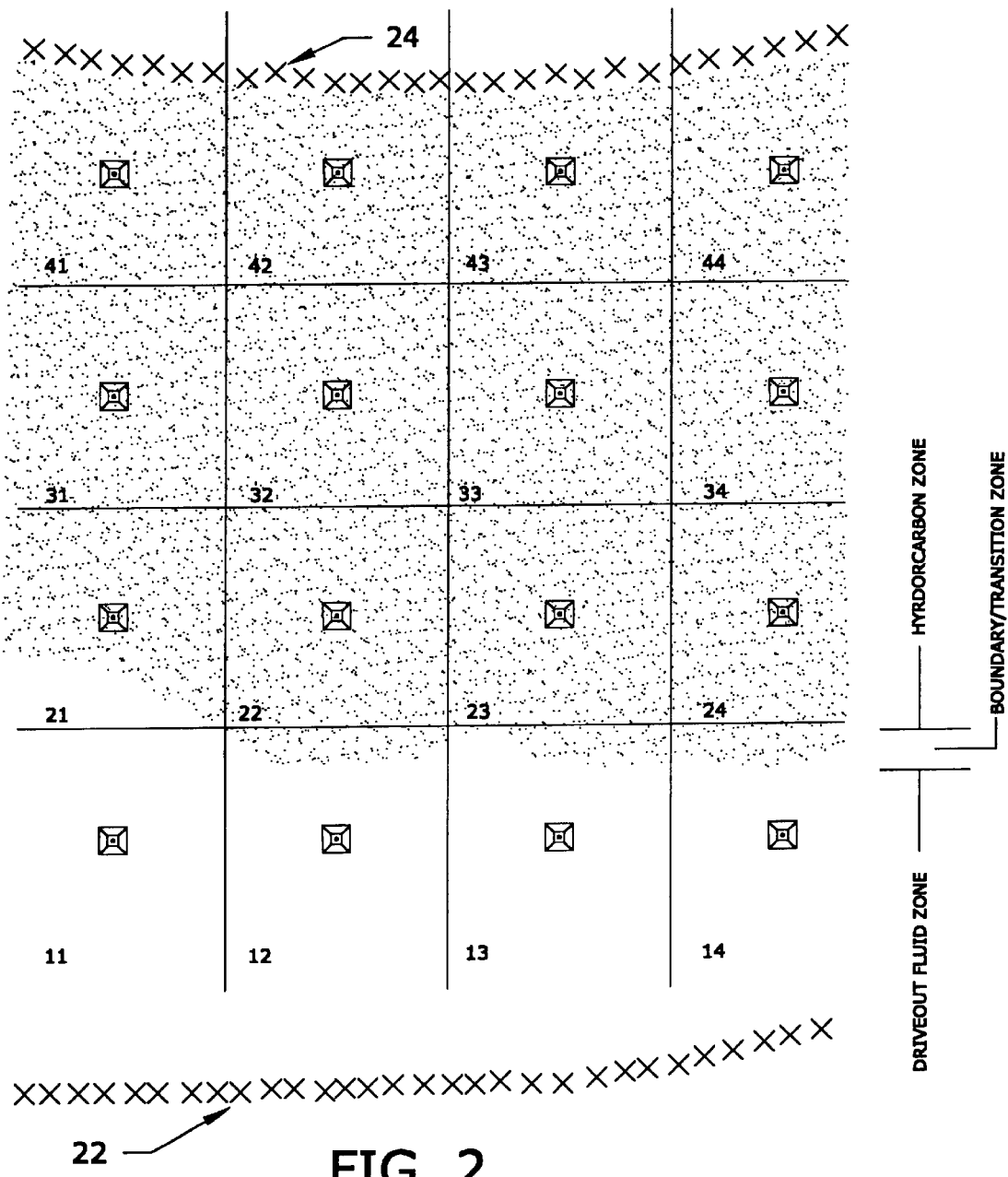
FIG. 2 is a top view of the reservoir of FIG. 1 showing an oil boundary as a stippled band in the context of a direct-line drive configuration.

FIG. 2 is a plan view of the field of FIG. 1 showing a rectangular array of sixteen wells located at the center of defined blocks identified with row and column numbers. The marking 22 at the lower portion of FIG. 2 represents the location of the sub-surface fault line 16 of FIG. 1 and the curvilinear marking 24 at the upper portion of FIG. 2 represents the outline of the periphery of the salt dome 20 of FIG. 1. In FIG. 2, the wells in blocks 11, 12, 13, and 14 are injection wells injecting a driveout fluid into the oil-permeated layer 10 while the remaining wells are conventional oil output wells. The stippled zone passing partially through blocks 21 and 11 and completely through blocks 12, 13 and 14 from the left to the right in FIG. 2 represents the position of the sub-surface edge between the oil and the pressurized driveout fluid. As can be appreciated, the boundary or "front" is indistinct and nonuniform, reflecting the variations in permeability of the oil-permeated layer 10. In general, the boundary will move with time across the field away from the injection wells toward the producing wells.

Figure 4:
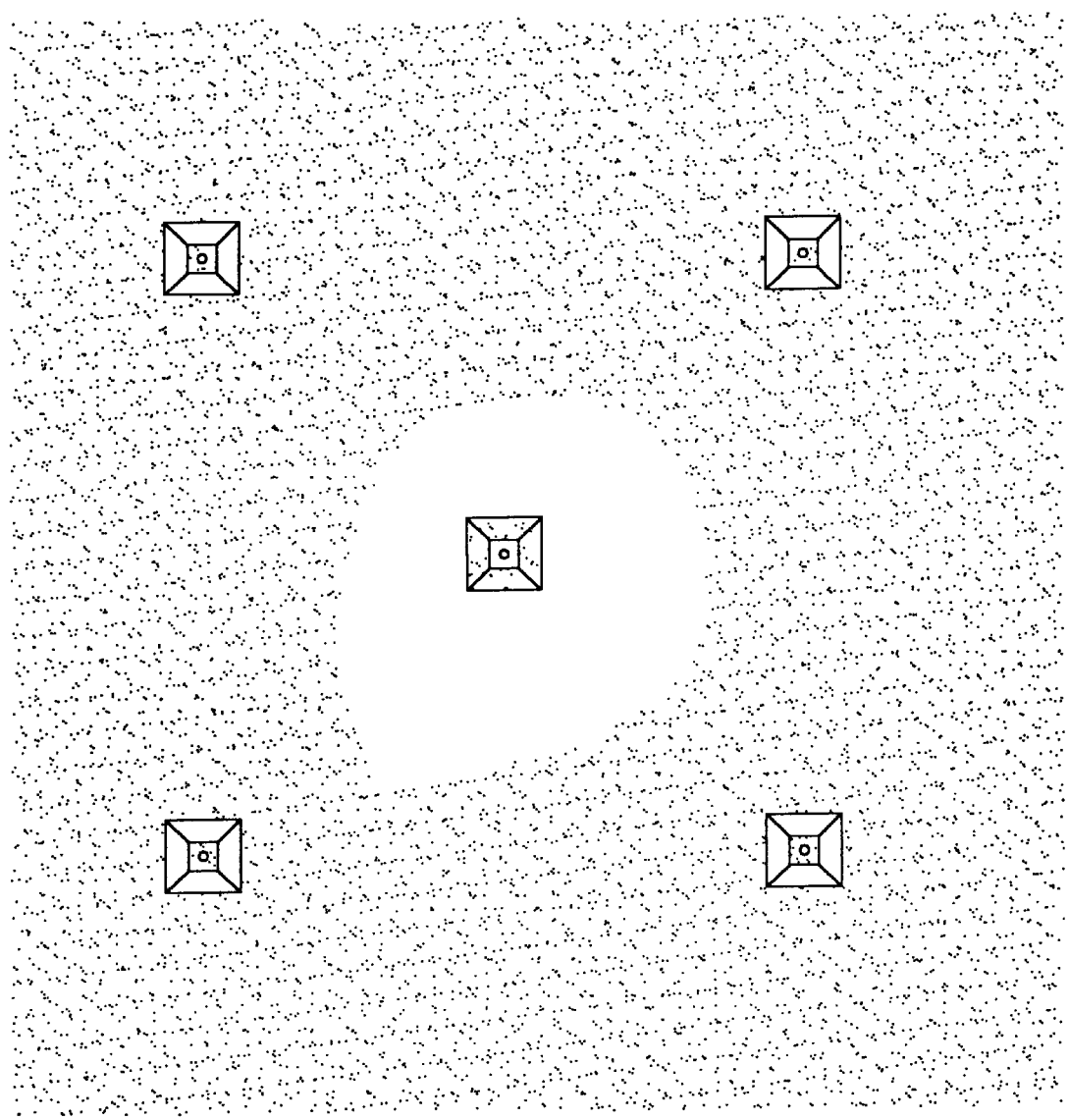
FIG. 4 is an example of a five-spot recovery configuration.

The configuration of FIG. 2 is known as a direct line-drive configuration since a line of injection wells in blocks 11, 12, 13, and 14 pumps the driveout fluid into the oil-permeated layer. Alternative configurations include the placement of the injection wells between producing wells as shown, for example, by the 5-spot configuration of FIG. 4. In the 5-spot configuration, an injection well is placed at the center of an array of four producing wells. The centrally located injection well injects the driveout fluid to create a sub-surface boundary that extends around the injection well to sweep, displace, or drive the oil towards and to the production wells. Variations of the 5-spot configuration include the 7-spot and the 9-spot configurations (not shown) in which the centrally located injection well is surrounded by seven and nine production wells respectively.

Figure 3:
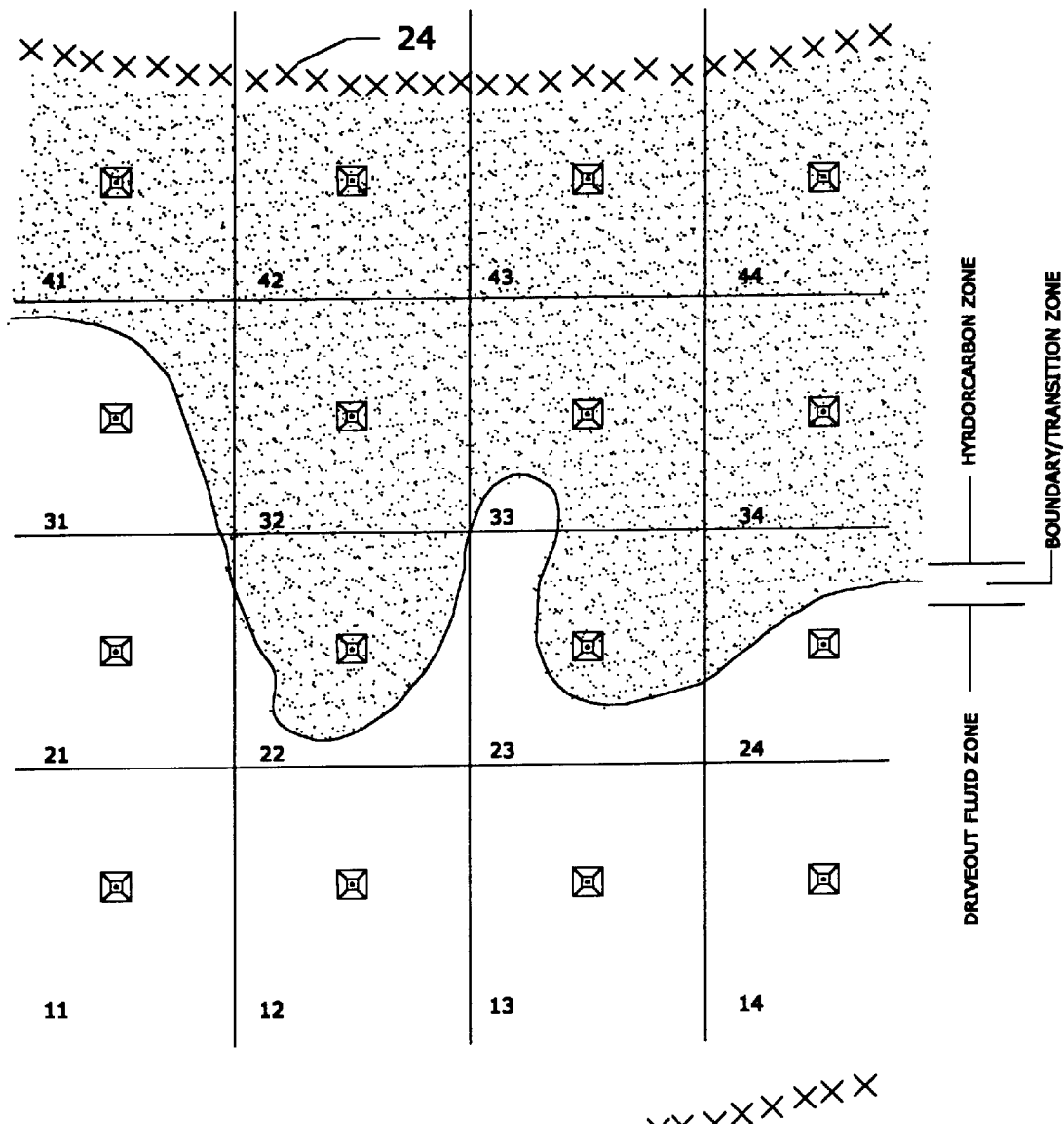
FIG. 3 is the view of FIG. 2 showing the oil boundary displaced from the position shown in FIG. 2.

FIG. 3 is a representation of the field of FIG. 2 displaced in time to show the migration of the boundary between the driveout fluid and the to-be-displaced oil over a period of time. In general, the time difference between FIG. 2 and FIG. 3 can be measured in weeks, months, or years, depending upon the size of the reservoir involved and the injection and production rates. As shown, the boundary moved further away from the injection wells with different portions of the front moving at different velocities to substantially change the morphology of the boundary. More specifically, the boundary at the left has moved past the wells in blocks 21 and 31 while the boundary at the right has moved only past the well in block 24. Additionally, a portion of the boundary between the wells in blocks 22 and 23 has moved into and toward the well in block 33. The particular morphology shown between the wells in blocks 22 and 23 into block 33 is highly suggestive of a theft zone, i.e., a volume of relatively higher permeability material that allows the pressurized driveout fluid to form a channel therethrough that can punch through to a producing well and substantially reduce recovery efficiency.

Information as to the position, extent, morphology, and velocity of the boundary with time would be valuable in managing the injection wells to optimize the area swept by the moving boundary and thus optimize recovery. Information relating to changes with time of the oil layer is useful in predicting depletion trends, identifying the location and extent of remaining resources, and provides information as to placement of new injection and production wells to optimally increase yield.

In the context of FIG. 1A, the density of an arbitrary volume unit is a function of the density of the liquid and gas fluids, the liquid and gas fluid saturations, the density of the rock matrix, and the porosity of the rock. The change in density $\Delta\rho$ for a reservoir volume unit $\Delta V$ can be represented as:

$$\Delta\rho = P \left( \rho_f \Delta_f + \rho_g \Delta_g \right)$$

where $\rho f$ is the density of the liquid, $\Delta_f$ is the change in liquid saturation, $\rho_g$ is the density of the gas, and $\Delta_g$ is the change in gas saturation.

In general, the rock has a typical density of between about 1.9 and 3.0 $g/cm^3$ and the oil has a density of between 0.7 $g/cm^3$ in the case of light oil and 0.9 $g/cm^3$ in the case of heavier oil; accordingly, the oil-permeated material can be viewed as having a composite density. As the driveout fluid displaces and replaces the trapped oil, the composite density changes as a consequence of the displacement of the oil and the occupation of the pores by residual oil and the driveout material. In the case of an arbitrary volume unit at point "A" in FIG. 1A, the density is a function of the rock matrix, the residual oil (about 10%) and the newly introduced steam (about 30%) and water (about 60%). Thus, the density difference between volume units at point "A" and at point "B" in FIG. 1A represents a density contrast that will affect the local gravity gradient in such a way that changes in that gradient can be ascertained on the surface. In general, the density contrast will be less than a few tenths of a $gram/cm^3$; the lateral dimension of the transition zone across which the density contract occurs is believed to range between tens and hundreds of feet.

Figure 5:
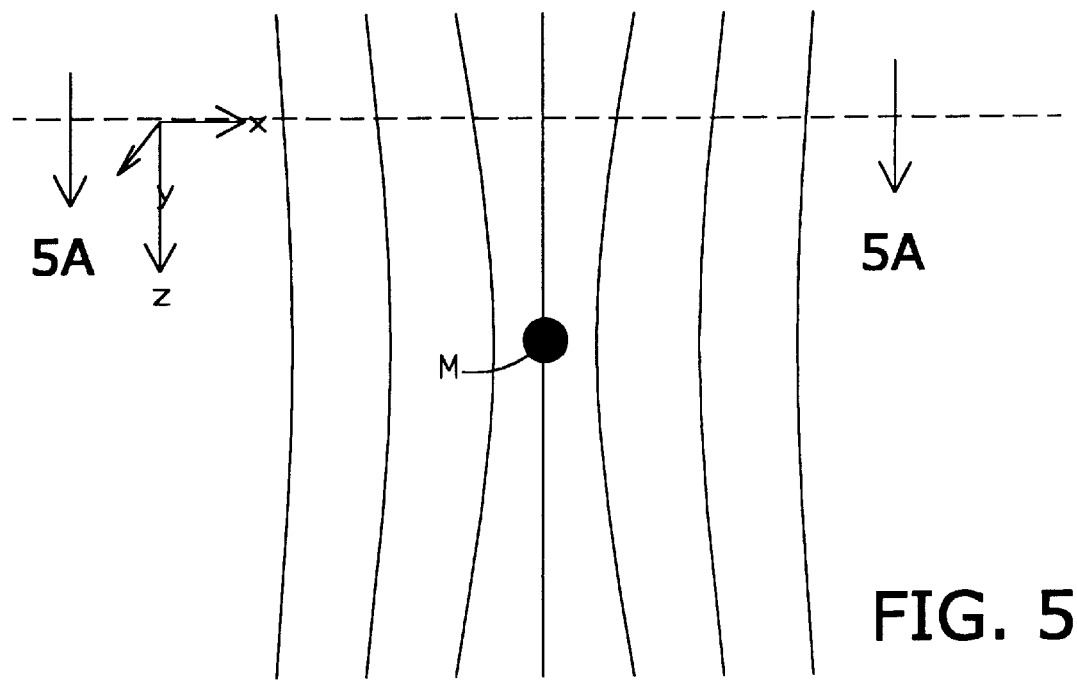
FIG. 5 illustrates the manner by which a uniform gravity field is perturbed by a mass.

The earth's gravitation field varies between a low of about 978 gals at the equator to about 983 gals at the poles with gradients characterized in Eotvos units, where one Eotvos unit equals $10^{-9} sec^{-2}$. For an idealized homogeneous sphere, an equipotential surface outside of the sphere is also spherical. However, density inhomogeneities in the sphere give rise to an equipotential surface that is not spherical; for such a surface, the curvature of any point is different in different directions. The two directions along which the curvature is maximum and minimum are termed the principal directions; the difference in curvature along these two direction is termed the differential curvature, as explained more fully below. In the context of the earth, local variations in gravity are caused by deviations in the surface of the earth from a geometric sphere, surface geology, water tides, atmospheric tides, and the change in relative position of the earth, the moon, and the sun. For any relatively small volume unit in free space, an idealized gravity field can be viewed as a set of unidirectional field lines aligned along the local vertical and having zero magnitude in the x,y directions. In the event a mass is placed within that volume unit, the gravity field will be perturbed. For example and as shown in FIG. 5, a dense cylindrically shaped mass M having hemispheroidal ends and a finite length along a major axis located at the center of an arbitrary volume unit will perturb the local gravity field within that volume unit by causing those field lines closest to the mass M to curve toward the mass M and the field lines next removed from the nearest field lines to curve toward the mass M somewhat less.

For any observation point within an arbitrary volume unit, the gravity field at that observation point can be resolved into x,y,z components of which the z vector will have the largest magnitude and the x,y vectors will have respective magnitudes that are a function of the location of that observation point relative to the perturbing mass M. For observation points in a plane above or below the mass M in FIG. 5, the vector information at that observation point will provide declination or inclination information as the perturbation of the field. In the context of the example of FIG. 5A, a sufficient number of observations in a plane above the mass M (or a plane below the mass M) will create a data set from which one or more isopotential surfaces can be obtained that graphically define the perturbation in the gravity field caused by the introduction of the mass M.

In general, the gravity field along the z axis can be measured by uniaxis gravimeters of which a common type uses lasers and a high-precision clock to time a mass falling between two vertically spaced points in an evacuated space. Gradiometers, as distinguished from gravimeters, measure the curvature gradients (or differential curvature or ellipticity of the gravity equipotential surfaces), horizontal gradients (or the rate of change of the increase of gravity in the horizontal direction), or vertical gradients (or the rate of increase of gravity in the vertical direction). Various processes and instruments have been developed to measure the gravity gradient. These processes and instruments include the lateral deviation of a mass suspended from a string (Bouguer's method) and the torsional twist exerted on a horizontally suspended beam carrying unequal masses at each end (Cavendish and Eotvos beams). Contemporary gravity gradiometers utilize force-restoring accelerometers to measure the lateral x,y components of the gravity gradient. In general and in its simplest form, an accelerometer utilizes a mass suspended at the end of a yieldable beam. Any deviation of the position of the mass from a null position caused by an acceleration experienced by the mass is detected and the mass restored to its null position by a magnetic field applied by a restoring coil. The current flow in the restoring coil is proportional to the acceleration experienced by the mass.

Figure 5A:
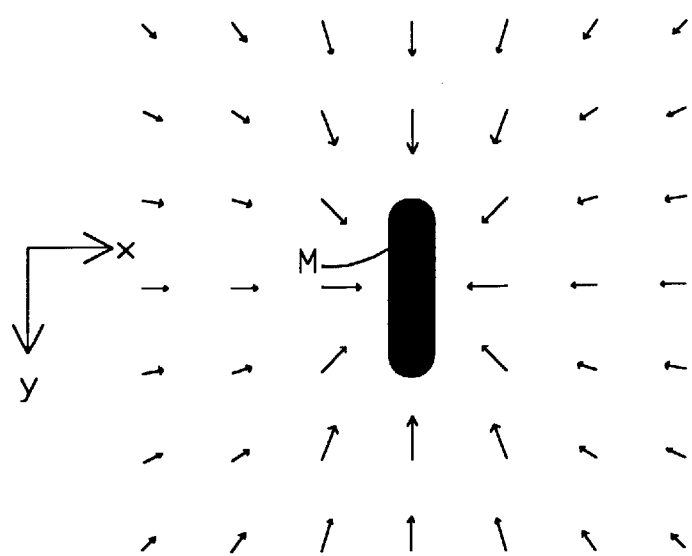
FIG. 5A is a top view of the field of FIG. 5.

Some modern gravity gradiometers utilize plural pairs of accelerometers that are moved at a constant velocity along an orbital path about an axis. Information from each accelerometer at any angular position in the orbit provides information as to the lateral acceleration experienced by the acceleration. In the context of FIG. 5A, an accelerometer moving at a constant angular velocity about the orbital path in the observation plane above the mass M will experience positive and negative accelerations in the x,y directions and output a sinusoidal waveform that is modulated with the gravity anomaly information in that observation plane. Where the observation plane is normal to the local vertical, the output of the accelerometer does not contain a component representative of the z axis. Conversely and as explained below in the context of the preferred test protocol, if the accelerometer is in an observation plane that is tilted relative to the field lines, the output of the accelerometer will also be modulated with z axis information.

A gravity gradiometer suitable for the present invention includes a gravity gradient instrument (GGI) sold by the Lockheed Martin corporation (Buffalo N.Y. USA); the Lockheed Martin GGI, the basic structure of which is shown in FIG. 6, is preferred in the context of the present invention. The basic structure and operation of the Lockheed Martin GGI is described in U.S. Pat. No. 5,357,802 issued Oct. 25, 1994 to Hofmeyer and Affleck and entitled "Rotating Accelerometer Gradiometer," the disclosure of which is incorporated herein by reference.

Figure 7:
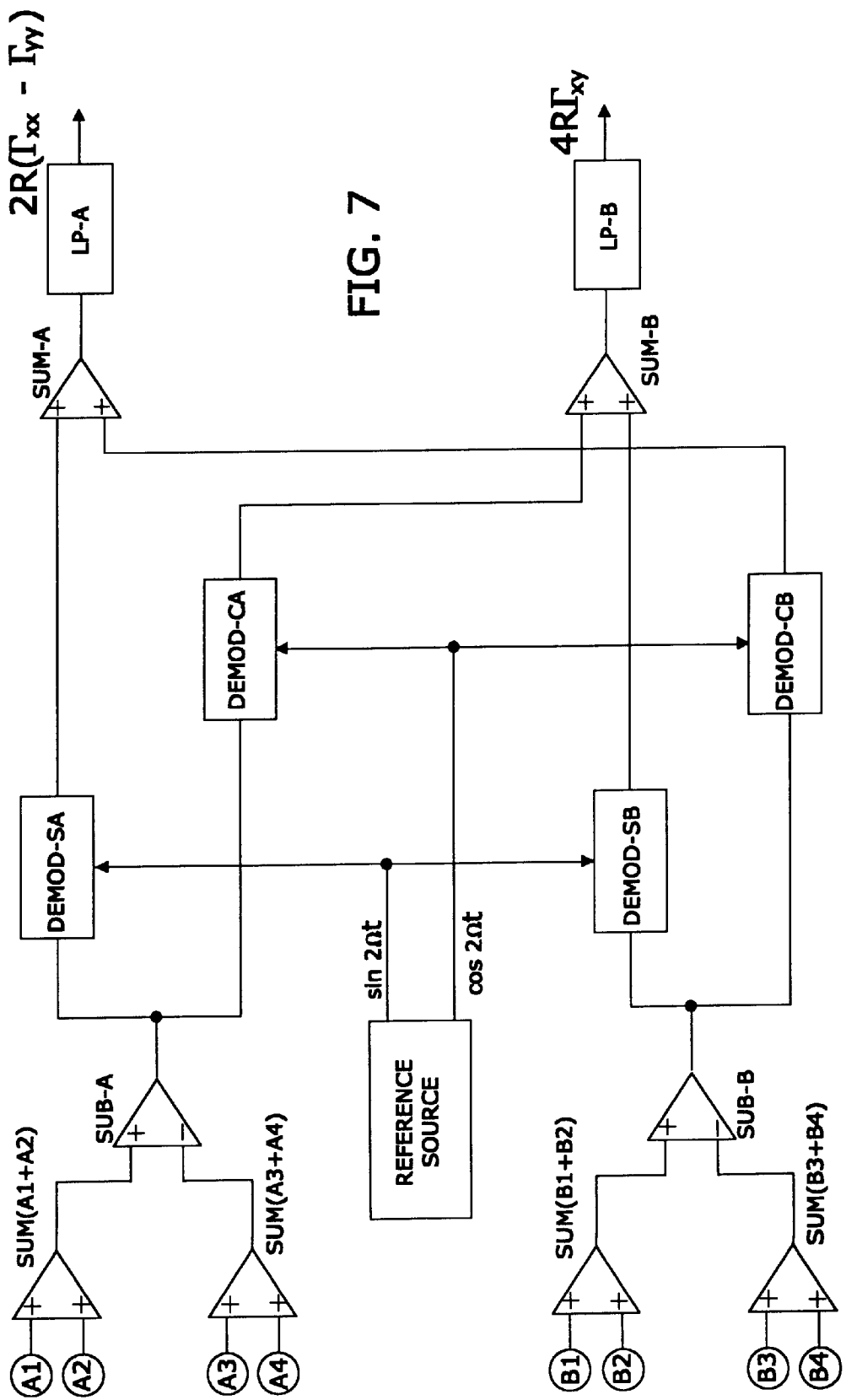
FIG. 7 is a functional block diagram showing the manner by which the accelerometer output of the gravity gradiometer of FIG. 6 is processed.

As shown in FIGS. 6 and 7, the GGI includes eight accelerometers 100 mounted at a common radius and equi-spaced about the periphery of a rotor assembly 102 that is rotated at a constant and controlled angular velocity about a spin axis $A_x$. The rotor assembly 102 includes the rotor 104 carried on a support shaft 106 for rotation therewith. The rotor assembly 102 is rotatably mounted in ball bearings 108 and, in turn, carried in a vibration-isolating flex-mount assembly 110. Processing electronics 112 are mounted on the rotor 104 adjacent each accelerometer 100 for processing the output signal therefrom as explained below in the context of FIG. 7. An inner housing 114 contains the rotor assembly 102 and is designed to rotate with the rotor assembly 102. An outer housing 116 contains the interior components and includes one or more heaters 118 designed to operate the instrument at some controlled temperature above ambient (i.e., about 115° F.) and also includes a magnetic field shield 120. A slip ring assembly 122 at the upper end of the mounting shaft 106 provides the electrical/signal interface with the rotor assembly 102 and the active devices thereon. A shaft encoder 124 at the lower end of the mounting shaft 106 cooperates with an encoder pick off 126 to provide rotary position information. The output of the encoder pick off 126 is provided to a computer and speed controller, which, in turn controls a drive motor 128 at the upper end of the unit to provide a controlled rotary velocity.

Each accelerometer 100 provides a sinusoidally varying analog output that is a function of the acceleration experienced by each accelerometer as the accelerometer orbits the spin axis. For a gradiometer having its spin axis aligned along the field lines in an ideally uniform and unperturbed gravity field, each accelerometer experiences the same acceleration forces as its proceeds along its orbital path. However, where the local gravity field is perturbed by the presence of one or more masses and/or the spin axis is tilted relative to the local vertical field lines, each accelerometer will experience different accelerations throughout its orbit. The quantitative output of each accelerometer, coupled with it rotary position, provides information related to the local gravity gradients.

At any observation point, the gravity gradient is a second order derivative of the gravity potential scaler $\Gamma$ and is represented by a second-order nine-component symmetric tensor $\Gamma_{ij}$ as follows:

$$\Gamma_{i,j} = \begin{matrix} \Gamma_{x,x} & \Gamma_{x,y} & \Gamma_{x,z} \\ \Gamma_{y,x} & \Gamma_{y,y} & \Gamma_{y,z} \\ \Gamma_{z,x} & \Gamma_{z,y} & \Gamma_{z,z} \end{matrix} \qquad \text{EQ. 1}$$

The components $\Gamma$ and $\Gamma_{y,z}$ are approximately equal to the variation of the force of gravity along the x and y directions, respectively, and are known as the horizontal gradient components, and $\Gamma_{z,z}$ is known as the vertical gradient of gravity. The differential curvature is related to $\Gamma_{x,x}$, $\Gamma_{y,y}$, and $\Gamma_{x,y}$ as follows:

$$[(\Gamma_{x,x}-\Gamma_{y,y})^2+4(\Gamma_{x,y})^2]^{1/2}/F \qquad \text{EQ. 2}$$

where F is the force of gravity.

In addition to the differential curvature of Eq. 2, a curvature vector whose magnitude equal the differential curvature is also defined by the value $\lambda$ as follows:

$$\lambda = \tfrac{1}{2} \tan^{-1} [2\Gamma_{x,y}/(\Gamma_{y,y}-\Gamma_{x,x})] \qquad \text{EQ. 3}$$

where $\lambda$ is the angle of the differential curvature vector relative to the x axis.

As is known, the diagonal elements are scalar invariant and conform to the Laplacian relationship:

$$0=\Gamma_{x,x}+\Gamma_{y,y}+\Gamma_{z,z} \qquad \text{EQ. 4}$$

from which it follows:

$$\Gamma_{z,z}=-(\Gamma_{x,x}+\Gamma_{y,y}) \qquad \text{EQ. 5}$$

Additionally, three pairs of the nine elements are symmetrically equal, i.e., $\Gamma_{x,z}=\Gamma_{z,x}$, $\Gamma_{y,z}=\Gamma_{z,y}$, and, lastly, $\Gamma_{x,y}=\Gamma_{y,x}$ so that the tensor is characterized by five independent components.

The gradients $\Gamma_{y,y}-\Gamma_{x,x}$ and $2\Gamma_{x,y}$ in Eq. 1 are the two curvature gradient components, while $\Gamma_{x,z}$ and $\Gamma_{y,z}$ are the two horizontal gradient components; $\Gamma_{z,z}$ is the vertical gradient component.

The output of the accelerometers is processed in accordance with the block diagram of FIG. 7; processing may be effected by discrete solid-state functional devices, by software or firmware controlled microprocessors or computers, by an application specific integrated circuit (ASIC), or by any combination thereof.

As shown, the pre-processed outputs of the eight accelerometers 100 of the gravity gradient instrument GGI of FIG. 6 are divided into two groups 'A' and 'B' of four with each group sub-divided to two sub-groups i.e., (A1,A2), (A3,A4), (B1,B2), and (B3,B4).

The accelerometer outputs A1, A2 are presented to the inputs of summing device SUM(A1+A2) and the outputs A3, A4 are likewise presented a summing device SUM(A3+A4). The summed outputs of the devices SUM(A1+A2) and SUM(A3+A4) are presented to a subtractor SUB-A. In a similar manner, the accelerometer outputs B1, B2 are presented to the inputs of summing device SUM(B1+B2) and outputs B3, B4 are likewise presented a summing device SUM(B3+B4). The summed outputs of the devices SUM (B1+B2) and SUM(B3+B4) are presented to a subtractor SUB-B. The summation of the signals of the diametrically opposed accelerometers 100 effectively cancels the component of acceleration due to any displacement in the rotor assembly in the XY plane. The differencing operation in the subtraction circuits SUB-A and SUB-B removes the effect of any angular acceleration of the rotor assembly that may occur in response to angular speed correction signals sent to the motor by its speed controller.

A set of four demodulators demodulate the outputs of the subtraction devices SUB-A and SUB-B in response to inphase and quadrature reference signals at twice the rotational frequency of the rotor assembly and by a reference signal source. The reference signal source can include a phase-locked loop oscillator locked in phase to revolutions of the rotor assembly 102 in response to the output of the encoder pickoff 126. The inphase reference signal sin 2ΩT is applied to demodulators DEMOD-SA and DEMOD-SB connected, respectively, to the output terminals of the subtraction circuits SUB-A and SUB-B. In a similar manner, the quadrature reference signal cos 2ΩT connected to demodulators DEMOD-CA and DEMOD-CB, also connected, respectively, to the output terminals of the subtraction circuits SUB-A and SUB-B. The output signals of the four demodulators DEMOD-SA, DEMOD-SB, DEMOD-CA, and DEMOD-CB take the form of squared values of sine and cosine signals. More specifically, DEMOD-SA outputs a value 2R $(\Gamma_{xx}-\Gamma_{yy})\sin^2 2\Omega t$ and the associated 4Ωt terms, the demodulator DEMOD-CA outputs a value $4R\Gamma_{xy}\cos^2 2\Omega t$ and the 4Ωt terms, the demodulator DEMOD-SB output a value minus $4R\Gamma_{xy}\sin^2 2\Omega t$ and the 4Ωt terms, and, lastly, the demodulator DEMOD-CB outputs a value 2R $(\Gamma_{xx}-\Gamma_{yy})\cos^2 2\Omega t$ and the 4Ωt terms. The term 2R is the distance between opposing accelerometer sets, i.e., the distance between accelerometer pair A1 and A2.

Summing circuit SUM-A accepts the output signal of the demodulators DEMOD-SA, and DEMOD-CB and provides the summed output though a low-pass filter LP-A. In a similar manner, summing circuit SUM-B accepts the output signal of the demodulators DEMOD-SB and DEMOD-CA and provides the summed output though a low-pass filter LP-B.

The output signals of the demodulators DEMOD-SA, DEMOD-SB, DEMOD-CA, and DEMOD-CB include higher frequency components in terms of frequencies equal to four times the rotational frequency of the rotor assembly. The gradient data, apart from a scale factor, is given by both the squared sinusoid and the squared cosinusoid components of the demodulated signals. These components sum together at the summing circuits SUM-A and SUM-B to provide a DC (direct current) value of the gradient data, along with the higher-frequency components. The low-pass filters LP-A and LP-B function, respectively, to filter the output signals of the summing circuits SUM-A and SUM-B and attenuate the high-frequency components so as to provide the desired DC components of the signals representing the gradient data. The gradient data is outputted from the low-pass filter LP-A in the form of an expression that includes the term 2R(Γxx−Γyy), and from the low-pass filter LP-B in the form of the expression 4R(Γxy).

Dividing the outputs 2R(Γxx−Γyy) and 4R(Γxy) by 2R yields two results, (Γxx−Γyy) and 2 (Γxy), that define the curvature vector; the magnitude of the curvature vector is known as the "differential curvature" or the "horizontal directing tendency" and is the square root of the sum of (Γxx−Γyy)² and (2Γxy)².

The direction $\lambda$ of the curvature vector with respect to the X-axis is represented by:

$$\lambda = -\tfrac{1}{2} \tan^{-1}(2\Gamma xy/(\Gamma yy - \Gamma xx))$$

The description above in relationship to FIG. 7 presents the function of the GGI when the sensitive axes of the accelerometers are in the plane normal to the vertical. In this orientation, the instrument is optimized for sensing the x,y components of the gravity gradient. However, a number of errors can be introduced into the signal output as a consequence of the structure of the instrument itself. In the design of the GGI, the mass is sought to be distributed in a uniform and symmetric manner about the spin axis $A_x$. Because the GGI uses discrete devices, some mass asymetricities exit about the spin axis. Additionally, the GGI is not mass-symmetric above and below the plane of the rotor 104. While the mass asymmetry is small, the asymmetry is physically close to the accelerometers and is believed to have an influence as an error component.

In accordance with one feature of the present invention and as explained below in relation to the test protocol of FIG. 10, the GGI is operated in at least two orthogonally spaced headings (i.e., 90 degrees). Since the instrument-specific bias and instrument-specific gradient errors are "fixed" to the instrument itself and its connected structures, rotating the GGI about its spin axis to the two orthogonal headings will not change the values of the instrument-specific bias and instrument-specific gradient errors while, concurrently, the sign of the measured earth's fixed gradients are reversed. By averaging the differences between the measurement sets at two orthogonal headings, absolute values of the earth's curvature gradients can be obtained since the instrument-specific bias and instrument-specific self-gradients will cancel out.

As explained in the mathematical presentation of FIG. 8, the primary output of the GGI can be characterized as an "in-line" I/L component and the secondary output can be characterized as a "cross" CR component. In the context of the functional block diagram of FIG. 7, the in-line and cross components can be assigned as shown in EQ. 1 and EQ. 2 in FIG. 8. The x axis of the GGI can be aligned, e.g., north, and, using the Euler Angle Sequence, the curvature gradients measured by the instrument x,y frame can be expressed as a function of the fixed curvature gradients of the earth in the north (n) and east (e) context as represented by EQ. 3 and EQ. 4 of FIG. 8. The GGI in-line outputs at a north azimuth heading (0 degrees) is represented in FIG. 8 by I/L(H=0°) and for the orthogonal measurement by I/L(H=90°). In a similar manner, the GGI cross outputs at a north and east heading are represented by CR(H=0°) and for the orthogonal measurement by CR(H=90°) so that bias-free values of the curvature gradient can be obtained from EQ. 5–EQ. 9 in FIG. 8.

As explained below in relationship of FIGS. 10A and 10B, the GGI is operated during the test protocol with its spin axis 'tilted' at a small positive angle and a small negative angle relative to the horizontal plane to generate a horizontal component of the gravity to excite the feedback compensation control loops in the GGI and allow for calibration of the accelerometer scale factors. However, the tilted spin axis couples the earth's horizontal gravity gradients into the curvature measurements of the GGI. Obtaining measurements with the GGI tilted at a small angle above the horizontal and at the small angle below the horizontal, in connection with measurements made at two azimuths headings that are 90 degrees apart, will yield measurements that double the desired curvature gradients and cancel out the undesired horizontal gradients.

The GGI includes orthogonal roll and pitch axes of which the roll axis is kept horizontal in the local x,y plane while the instrument is rotated about its roll axis to pitch the instrument up or down relative to the local horizontal plane. The term I/L indicates a line that is in the x,y plane of the GGI that can be aligned at an azimuth heading while the instrument x,y plane is pitched (tilted) at some small angle relative to the local x,y plane. The secondary gradiometer instrument output is the 'cross' term CR as explained above in relationship to EQ. 1 and 2 of FIG. 8. In the context of the mathematical presentation of FIG. 9, the I/L and the CR gradients measured by the GGI in its x,y frame can be expressed as a function of the earth's tensor gradient components in the geodetic north, east, and down (n, e, d) frame of reference. The direction cosine matrix (DCM) that transforms a north, east, and down geodetic frame to the x,y,z, instrument frame at a heading angle H and a pitch angle P represented in EQ. 1 of FIG. 9. The I/L and the CR GGI outputs are related to the geodetic gradients as represented in EQ. 2 and 3 of FIG. 9 where the terms "error (I/L)" and "error (CR)" include instrument self-bias and all instrument-specific gradient errors. As shown in EQ. 4 and EQ. 5, the sum of the up and down measurement are indicated where the superscript "U" indicates an "up" pitch, and the superscript "D" indicates a "down" pitch with EQ. 6 and EQ. 7 showing the relationship to the geodetic gradients. By applying the measurements at H=0 degrees and H=90 degrees, and computing the sum of the in-line and cross values result yields EQ. 8 and EQ. 9 to estimate the curvature gradients $\Gamma ee-\Gamma nn$ and $2\Gamma ne$ without coupling from the $\Gamma nd$ and the $\Gamma ed$ horizontal gradients and the $\Gamma dd$ vertical gradient with these values free of bias and instrument-specific self-gradient errors. EQ. 10 and Eq. 11 represent the difference between the "up" and the "down" I/L and the CR measurements while EQ. 12 and EQ. 13 provide the estimate of the horizontal gradients from measurements made 180 degrees apart.

Figure 10A:
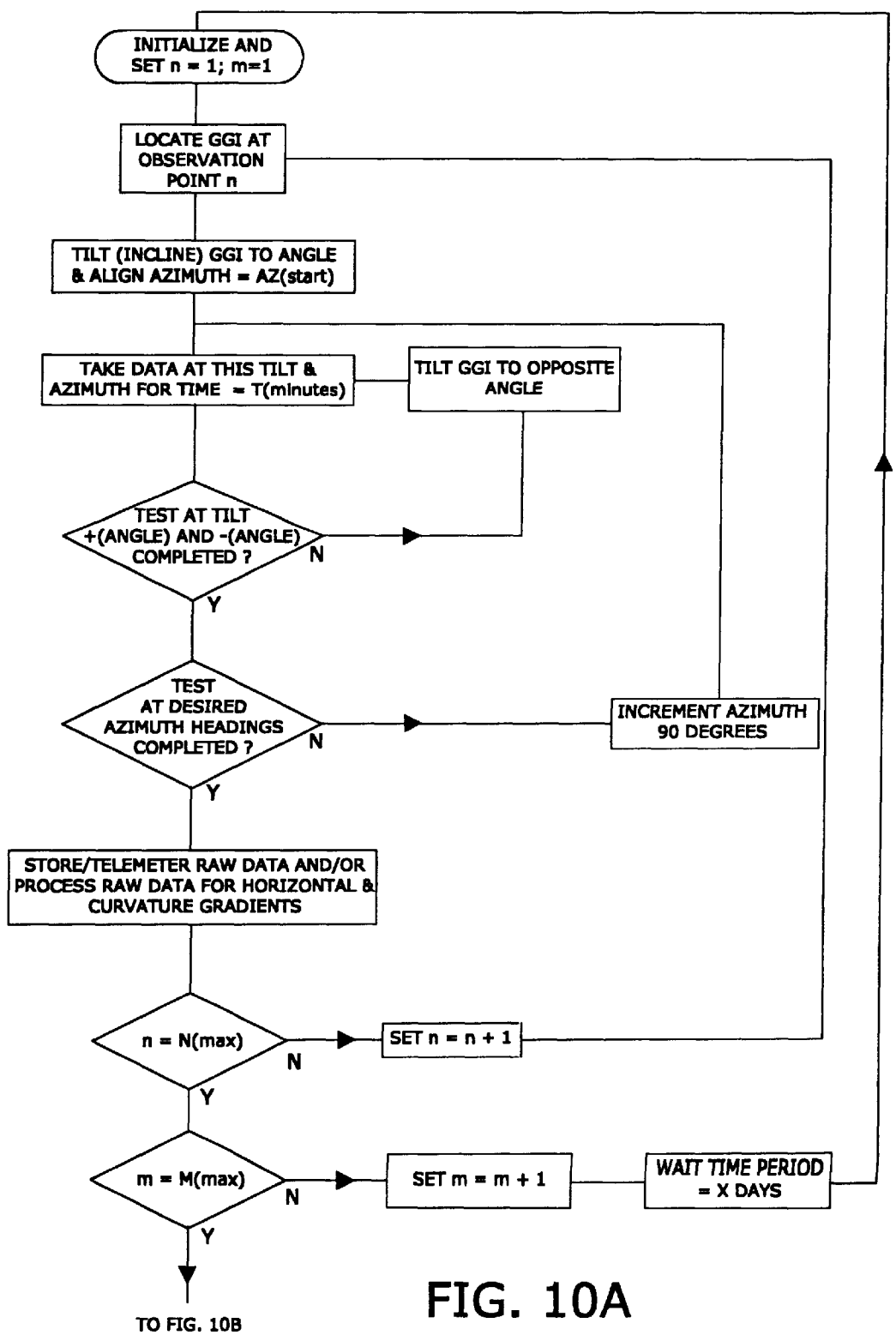
FIGS. 10A and 10B are a flow diagram of a test protocol for obtaining plural data sets.
Figure 10B:
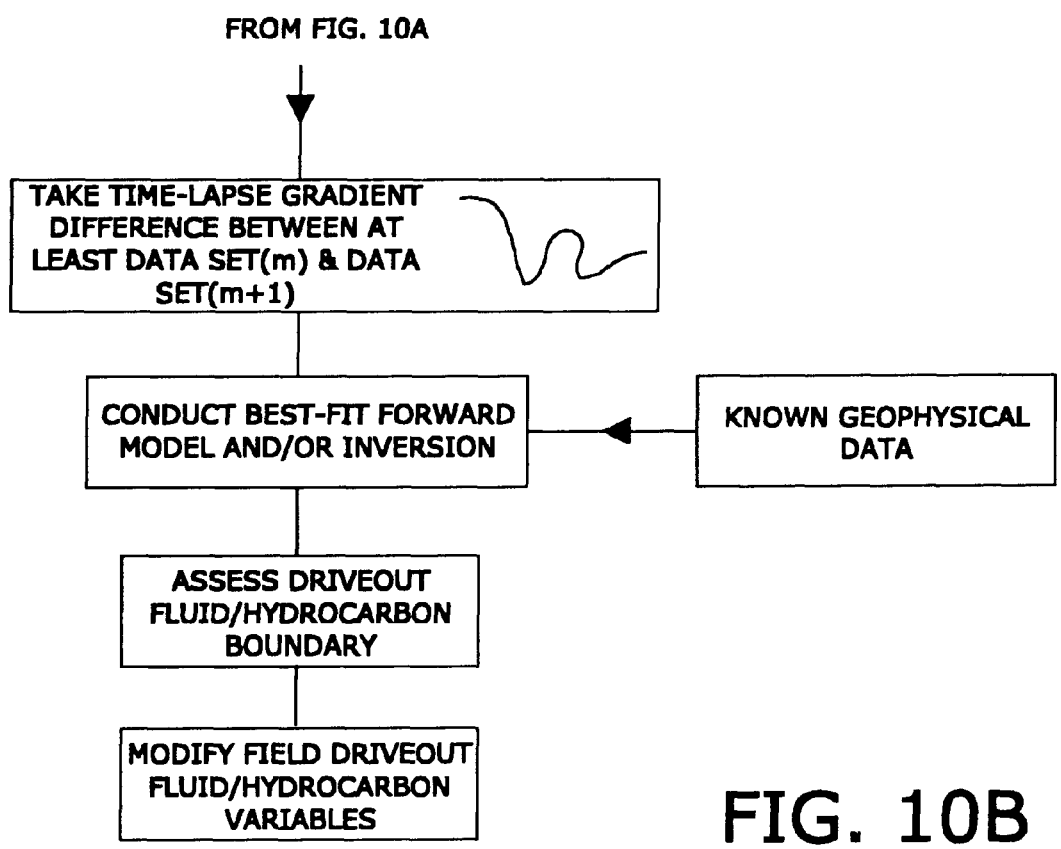

In accordance with the test protocol of the present invention and as shown in FIGS. 10A and 10B, a number of measurement stations n are established on the oil field. Each measurement station can take the form of an area of cleared earth or, more preferably, an asphalt or cement pad. It is important that the station location be fixed for the period of the first and subsequent tests. The measurement stations preferably can take the form of a rectangular array of observation positions, a polar array of observation positions, or a mix thereof including observation stations that do not follow a pre-assigned pattern and can be considered as randomly placed within the field under observation. For example and in the context of FIGS. 2 and 3, the measurement positions can correspond to the position of the row and column block numbers shown.

The GGI is preferably mounted on a small, wheeled cart that can be moved from station to station as the test proceeds. Depending upon the distance between observation stations, the GGI can be transported, for example, by a wheeled or other vehicle. If desired, the GGI can be mounted on a wheeled vehicle and driven from station to station and the measurements taken from the vehicle. The mobile cart is preferred, however, as the use of the cart eliminates gravitation anomalies introduced by the wheeled vehicle from the data set. At each of the measurement stations, the cart is elevated on elevation control jacks.

As shown in the flow diagram of FIG. 10A, the system is initialized and the variables m and n set equal to 1; n being representative of the number of pre-established measurement stations where the maximum number of measurement stations is N(max) and m representing the number of data sets to be taken over time where the maximum number is M(max).

The GGI is positioned at the first measurement station and, prior to the initiation of data taking, all objects having a mass sufficient to affect the measurements (transport vehicle(s), power sources, local computer control, personnel, etc.) are moved a sufficient distance away from the instrument to minimize any adverse effects on the instrument from those objects. In general, each measurement station is preferably not located next to man-made fixed-in-place static structures to minimize large signals that are not related to the locations of the boundary interface.

Thereafter, the GGI is initialized and the spin axis is inclined to some pre-selected tilt angle (i.e., plus about 0.9 degree in the case of the present invention) sufficient to provide a z axis response in the accelerometers and the instrument aligned at an azimuth heading of zero degrees. As explained above in relationship to FIG. 9, the 'tilting' of the rotor assembly at some angle sufficient for the eight accelerometers to sense the gravity vector allows the instrument to observe the output of each accelerometer for that gravity value, identify the scale factor of each accelerometer, the differences in the scale factors between the accelerometers, and identify an adjustment value so that all accelerometers provide an identical apparent output. As shown in the flow diagram of FIG. 10A, the instrument is also subsequently subject to a tilt at an opposite angle from the first so that cross-couplings from horizontal gradients can be eliminated. Thus, measurements taken at the first tilt angle includes instrument bias and, in a similar manner, measurements taken at the opposite tilt angle likewise contain instrument bias errors; the measurements for both tilt angles can then be averaged to cancel the bias error.

The GGI then takes data at the observation station for some period of time sufficient to insure minimization of error sources; in the case of the preferred GGI, a data taking interval on the order of several minutes (i.e., about five minutes) at each heading is considered adequate.

Thereafter, the instrument is declined to the its opposite angle (i.e., minus about 0.9 degree in the case of the present invention) and the data taking step repeated at the initial azimuth. Once data taking is completed at the initial aximuth heading for both the tilted up and tilted down attitudes, the instrument is rotated in azimuth by incremented ninety degrees and the tilted up and tilted down data taking steps repeated. The tilted up and tilted down data taking need only be conducted at two azimuth heading; however, the tilted up and tilted down data taking can be repeated at more azimuth headings, if desired, to increase the accuracy of the data taking. Rotation of the instrument to the new heading includes the instrument itself, its cart, and any associated structures, including any environmental enclosure. The rotation of the structures associated with the operation of the instrument itself assists in minimizing error sources. As explained above in relationship to FIG. 8, azimuth slewing functions to provide information necessary to remove error sources associated with the mass dissymmetry of the instrument itself and its immediate surrounding. This sequence proceeds until data is taken in at least three orthogonal azimuth headings; however, in the case of the preferred embodiment, data is taken at 0, 90, 180, 270, and then again at 0 degrees. If additional information is desired, data taking steps can be repeated at the various headings.

As explained in more detail above, the taking of data at different azimuth headings and at different tilt angles is designed to minimize error sources and effectively increase the sensitivity of the instrument.

Thereafter, n is incremented by one and the GGI moved to the next successive measurement station and the sequence at that station repeated.

When data is taken at each of the n measurement stations (i.e., n=N(max), the first data set is completed. In accordance with the present invention, a period of time (measured in weeks, months, or years) is allowed to lapse during which the oil field undergoes continuous or non-continuous pressurization by the injected driveout fluid to cause migration of the interface between the driveout fluid and the hydrocarbons to be recovered. After the inter-test period has elapsed, the test sequence of FIG. 10A is repeated to yield another set of data characterized as the second data set. As can be appreciated, third, fourth and subsequent tests can be undertaken after suitable inter-test time periods have elapsed to yield third, fourth and subsequent data sets. In practice, two successive data sets (i.e., M(max)=2) are sufficient to provide usable data.

Each data set includes information as to the gravity gradient over the field including the effect of sub-surface geology, variations consequent to the terrain, and man-made fixed-in-place static structures including derricks, pipelines, pumps, motors, etc. that typically occupy an oilfield. In addition, that data set will include information as to the effect on the gravity gradient of the interface between the driveout fluid and the hydrocarbons undergoing displacement. However, there is no non-conjectural way that the location of the interface can be accurately determined from a single data set. As in the case of the first data set, second and subsequent data sets likewise include information as to the effect on the gravity gradient of the geology, terrain, and man-made structures and the interface at its new location. Thus, information as to the geology, terrain, and man-made structures will represent relatively invariant common data or common mode signal information between each data set while the information as to the transient-in-time interface will not be common to the various data sets.

Error sources that can adversely affect accuracy can include geologic movements, such as compaction of the oil reservoir and movement of the water table.

In order to process the first and second (and/or subsequent data sets) and as an initial step, a theoretical model of the relationship of the gravity gradient of the strata below the hydrocarbon reservoir of interest is developed. For any hydrocarbon reservoir undergoing secondary recovery, the probability is that a body of geophysical data, including a reservoir model, is available from prior acoustic surveys, borehole data logging, core samples, analysis of the output of test wells, and a knowledge of the presence or absence of (and changes thereof) the driveout fluid in the output of the production wells. If desired, the known geophysical data can be combined with available gravity gradient data obtained in accordance with the system and method of the present invention. More specifically, the gradient data can be 'best-fitted' to the geophysical data to provide a forward model of the reservoir and/or the gradient data can be similarly 'best-fitted' to the geophysical data using inversion techniques to obtain the best model of the reservoir and the model boundary between the driveout fluid and the hydrocarbon to be recovered.

In order to obtain the sub-surface density information, either forward modeling methods (also known as the indirect method) or direct methods can be used. Forward modeling methods start with existing knowledge about the reservoir layers in which injection is being carried out and assumes changes in the saturation levels of the different fluids, incorporating knowledge gained from other geophysical measurements (e.g., seismic) and other oil field observations, such as pressures and temperatures changes in the observation wells. From this starting model calculations of the time-lapse gradients can be made. For this purposed, the forward modelling method of Talwani, "Computation with the help of a digital computer of magnetic anomalies caused by bodies of arbitrary shape" in Geophysics, Vol. 30, No. 5, pps 797–817 (1965) can be utilized. The calculated values are compared with observed values of the time-lapse gradient, and the starting model iteratively modified so that the calculated values fit the observed values. Examination of the saturation values in the final model yield the position of the front between the driveout fluid and the hydrocarbons undergoing displacement.

With direct methods, existing knowledge about the reservoir is used as constraints and the observed data inverted to yield sub-surface density changes, which as for the forward modeling methods are related to fluid saturation changes.

Once the time-lapsed (i.e., 4D) gradient data is obtained, numerous computerized techniques are available to determine the change in the sub-surface density distributions (strata morphology) over the time period. Direct methods of using the gradient data to estimate density distributions fall into the category of linear problems and direct methods that determine boundary perturbations for constant density bodies fall into the category of nonlinerar problems as described by D. W. Vasco in "Resolution and Variance Operators of Gravity and Gravity Gradiometry" published in Geophysics, vol. 54, no. 7, (July 1989) pps. 889–899. The Vasco solution linearizes relations between prisms (of mass density or changes in density) and their associated gravity gradients and solves the inversion iteratively, using generalized inverses. Direct methods also include those described by S. K. Reamer and J. F. Ferguson in "Regularized two-dimensional Fourier gravity inversion method with application to the Silent Canyon caldera, Nevada" published in Geophysics, vol. 54, No. 4 (April 1989) pps. 486–496 and the wavelet-Galerkin techniques described in the above-incorporated U.S. Provisional application 60/099,937 filed Sep. 11, 1998. In general and for the Vasco technique, constraints such as a layer thickness greater than or equal to zero or all the boundaries to lie in the sub-surface may be included; other constraints include reasonable ranges in density after M. Cuer and R. Bayer as described in "Fortran Routines for Linear Inverse Problems" published in Geophysics, vol. 45, No. 11 (November 1980), pps. 1706–1719.

The initial model will be improved with increasing data and can be only the best known estimate at that time. The model, forward or inverse, is then perturbed analytically to determine the relationship between changes in the gravity gradient to changes in the strata morphology. Indirect methods for perturbing a starting or initial forward model include the "Directed Monte Carlo methods of Simulated Annealing and Genetic Algorithms ["Global Optimization Method in Geophysical Inversion," by M. Sen and P. L. Stoffa, Elsevler, Amsterdam, 1995].

Figure 11:
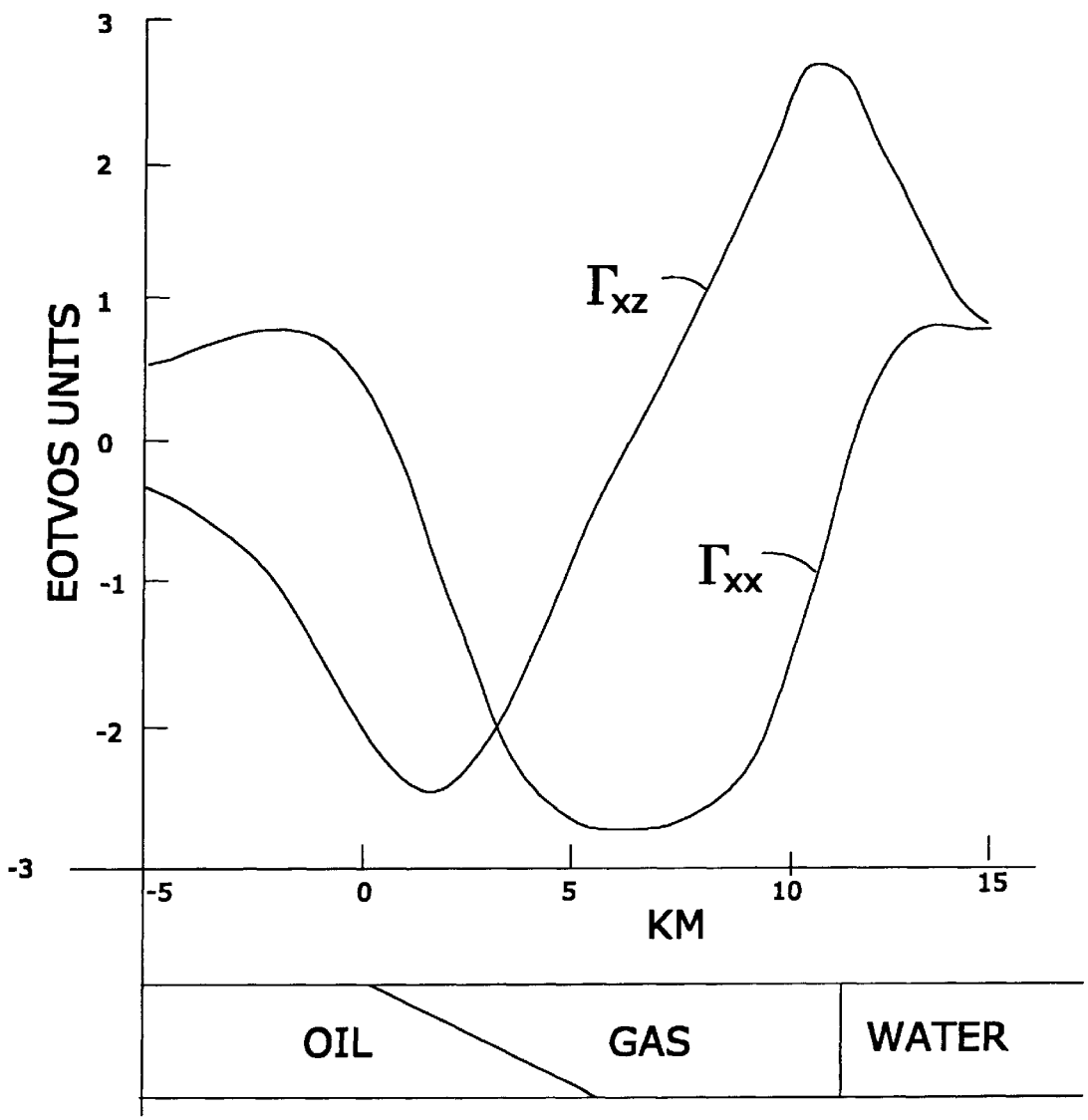
FIG. 11 is a graphical representation of gradient values at an interface.

Thereafter, the actual gravity gradient (of which a representative graphical representation for $\Gamma xz$ and $\Gamma xx$ is shown in FIG. 11) is compared with that predicted by the theoretical model to develop successive model iterations that converge with successively smaller differences in the comparisons. As additional data measurements are taken, as shown in the test sequences of FIGS. 10A and 10B, the model is successively refined. Before each model refinement, the measured data are processed to eliminate known and statistically estimated error sources including the effects of geologic "noise".

With sufficient data measurements, it is possible for the computer data processor to create a computer-displayed animation of the movement and morphology of the boundary interface with time for display on a computer monitor or similar display device. The processed data provided by the display yields information as to the boundary between the driveout fluid and the to-be-recovered hydrocarbon. Thereafter, the movement of the boundary and the rates of movement can be graphically printed or plotted for use by the oil field manager, who can control the injection wells in terms of pressure and quantity to use the morphology of the boundary in such a way as to maximize hydrocarbon recovery at the lowest possible secondary recovery cost. The illustration of hydrocarbon boundaries and their changes can be also used by the oil field manager for the identification of possible theft zones as suggested in blocks 22 and 23 of FIG. 3. Providing the oil field manager with this pictorial representation of the developing situation enables him to apply his expertise to evaluate, correct, and compensate for changing conditions and to maintain or to increase field production.

The present invention advantageously provides a system and process for secondary oil recovery by which the cost of recovery can be reduced and/or the quantity of hydrocarbon recovered can be increased. The present invention is likewise well suited for use in detecting the migration of sub-surface fluids including, for example, polluted and/or toxic fluid fronts. While an accelerometer-type gradiometer is shown as the preferred instrument for detecting the gravity gradient, other devices capable of measuring or otherwise ascertaining the local gravity gradient are likewise suitable. Other devices include paired gravimeters of the type that use falling masses in an evacuated space with the acceleration of the falling mass measured with a laser beam and high-accuracy clocks and gravity sensing instruments that use superconducting sensors.

As will be apparent to those skilled in the art, various changes and modifications may be made to the illustrated system and process for secondary oil recovery of the present invention without departing from the spirit and scope of the invention as determined in the appended claims and their legal equivalent.

What is claimed is:

1. A process for controlling fluid hydrocarbon production from a sub-surface hydrocarbon reservoir undergoing secondary recovery by injection of a driveout fluid therein and from which fluid hydrocarbons are removed in response to the driveout fluid injection, comprising:

performing a first assay of the gravity gradient above the reservoir;

performing at least a second assay of the gravity gradient above the reservoir, said first and second assay separated by a period of time;

identifying the position of the interface between the driveout fluid and the fluid hydrocarbons from data between the first and second assays; and controlling the injection of the driveout fluid to control removal of the hydrocarbons from the reservoir.

2. The process of claim 1, wherein said first assay is performed by measuring the gravity gradient at a plurality of measurement positions.

3. The process of claim 1, wherein said second assay is performed by measuring the gravity gradient at a plurality of measurement positions.

4. The process of claim 1, wherein said first assay and second assay are each performed by measuring the gravity gradient at a plurality of common measurement positions.

5. The process of claim 1, further comprising at least a third assay of the gravity gradient above the reservoir, said second and third assays separated by a period of time and thereafter identifying the position of the interface between the driveout fluid and the fluid hydrocarbons from data between the first and third assays, the second and third assays, or the first, second, and third assays.

6. The process of claim 1, further comprising combining known geophysical data relating to the reservoir with at least one of the gradient assays to obtain a combined geophysical/gravity gradient model of the reservoir.

7. The process of claim 6, wherein said combining step comprises combining the gravity gradient assay with the known geophysical data by forward modelling.

8. The process of claim 7, wherein said combining step comprises combining the gravity gradient assay with the known geophysical data by inversion.

9. The process of claim 1, wherein said controlling step comprises at least controlling one of the pressure, temperature, volume, and location within the reservoir of the injected driveout fluid.

10. A process for monitoring the interface between a driveout fluid and fluid hydrocarbons in a sub-surface reservoir undergoing secondary recovery by injection of the driveout fluid therein and from which fluid hydrocarbons are removed at least in response to the injection of the driveout fluid, comprising:

establishing a plurality of measurement positions for the measurement of the local gravity gradient;

performing a first set of measurements of the gravity gradient at each measurement position;

performing at least a second set measurements of gravity gradient at each measurement position, said first and second measurements separated by a period of time;

identifying the position of the interface between the driveout fluid and the fluid hydrocarbons from difference data between the first and second assays; and displaying the position of the interface between the driveout fluid and the fluid hydrocarbons.

11. The process of claim 10, further comprising performing at least a third measurement of the gravity gradient above the reservoir, said second and third measurements of the gravity gradient separated by a period of time and thereafter identifying the position of the interface between the driveout fluid and the fluid hydrocarbons from difference data between the first and third measurements, the second and third measurements, or the first, second, and third measurements.

12. The process of claim 10, further comprising combining known geophysical data relating to reservoir with at least one of the gradient measurements to obtain a combined geophysical/gravity gradient model of the reservoir.

13. The process of claim 12, wherein said combining step comprises combining the gravity gradient measurement with the known geophysical data by forward modelling.

14. The process of claim 12, wherein said combining step comprises combining the gravity gradient measurement with the known geophysical data by inversion.

15. The process of claim 10, wherein said measurements are performed by a gravity gradiometer.

16. The process of claim 11, wherein said measurements are performed by a gravity gradiometer of the type utilizing accelerometers.

17. A system for monitoring the interface between a driveout fluid and a fluid hydrocarbons in a sub-surface reservoir undergoing secondary recovery by injection of a driveout fluid therein and from which fluid hydrocarbons are removed at least in response to the injection of the driveout fluid, said system comprising:

a plurality of measurement positions for the measurement of the local gravity gradient above the reservoir;

a gravity gradient measuring instrument moved to at least some of said measurement positions for measuring the gravity gradient at each of said measurement positions to obtain a first set of gravity gradient data and for movement, at a time subsequent to the time the first set of data was obtained, to at least some of said measurements to obtain a second set of gravity gradient data;

a data processor for processing the first and second set of data to identify the position of the interface between the driveout fluid and the fluid hydrocarbon from difference data between the first and second sets of data, and a display device for displaying the so-identified position of the interface.

18. The system of claim 17, wherein said measurements are performed by a gravity gradiometer of the type utilizing accelerometers.

19. A process for monitoring the interface between a first fluid and a second fluid in a sub-surface volume in which one of said first and second fluids displaces the other of said first and second fluids with time, comprising:

performing a first set of measurements of the gravity gradient at the surface above the sub-surface volume;

performing at least a second set of measurements of gravity gradient at the surface above the sub-surface volume, said first and second measurements separated by a period of time;

identifying the position of the interface between the first fluid and the second fluid from at least difference data between the first and second sets of measurements; and displaying the position of the interface between the first and second fluids.

20. The process of claim 19, further comprising performing at least a third measurement of the gravity gradient above the sub-surface volume, said second and third measurements of the gravity gradient separated by a period of time and thereafter identifying the position of the interface between the first and second fluids from at least difference data between the first and third measurements, the second and third measurements, or the first, second, and third measurements.

21. A process for monitoring the sub-surface migration of at least a first fluid in a sub-surface volume in which the first fluid migrates in the sub-surface volume with time, comprising:

performing a first set of measurements of the gravity gradient at the surface above the sub-surface volume;

performing at least a second set of measurements of gravity gradient at the surface above the sub-surface volume, said first and second measurements separated by a period of time;

identifying the position of the edge of the at least first fluid from at least difference data between the first and second sets of measurements; and displaying the position of the edge of the at least first fluid.

22. The process of claim 21, further comprising performing at least a third measurement of the gravity gradient above the sub-surface volume, said second and third measurements of the gravity gradient separated by a period of time and thereafter identifying the edge of the at least one fluid from at least difference data between the first and third measurements, the second and third measurements, or the first, second, and third measurements.

* * * * *